United States Patent [19]

Jacques

[11] Patent Number: 4,678,293

[45] Date of Patent: Jul. 7, 1987

[54] REDUCED-WEIGHT MIRROR

[75] Inventor: Paseri Jacques, Bris Sous Forges, France

[73] Assignee: Recherches et Etudes d'Optique et de Sciences Connexes, Longjumeau, France

[21] Appl. No.: 833,206

[22] Filed: Feb. 26, 1986

[30] Foreign Application Priority Data

Oct. 23, 1985 [FR] France ............................. 85 15747

[51] Int. Cl.$^4$ ........................... G02B 5/10; G02B 7/18
[52] U.S. Cl. .................................................... 350/609
[58] Field of Search ............... 350/607, 609, 610, 611, 350/600, 618, 619, 620, 641, 503, 504, 505, 631, 603

[56] References Cited

U.S. PATENT DOCUMENTS 3,753,322  8/1973  Bordes .................................. 51/284

FOREIGN PATENT DOCUMENTS 1473408  of 1967  France .

505001  3/1976  U.S.S.R. ............................. 350/609

OTHER PUBLICATIONS

Soviet Inventions Illustrated Week K 04, V. D. Derevenskii.
Soviet Inventions Illustrated Week K 30, I. K. Meshkovskii.

Primary Examiner—Jon W. Henry
Attorney, Agent, or Firm—Thomas J. Greer, Jr.

[57] ABSTRACT

The invention relates to a mirror having a non-plane reflecting face (M$_2$), said mirror being constituted by a mass of optical material (M) having cells (A) formed therein in such a manner that the centers of gravity (g) of the portions of mirror material surrounding each cell lie in the same plane as the center of gravity (G) of the mirror as a whole. The invention is particularly applicable to large diameter mirrors used in telescopes and whose optical axes are generaly used in a horizontal position (or close thereto). The aim of the invention is to reduce the distortion phenomena which may occur due to the mirror bending under its own weight.

7 Claims, 4 Drawing Figures

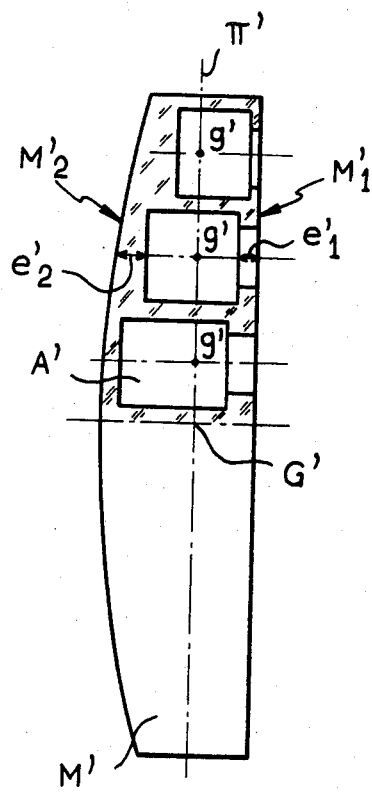
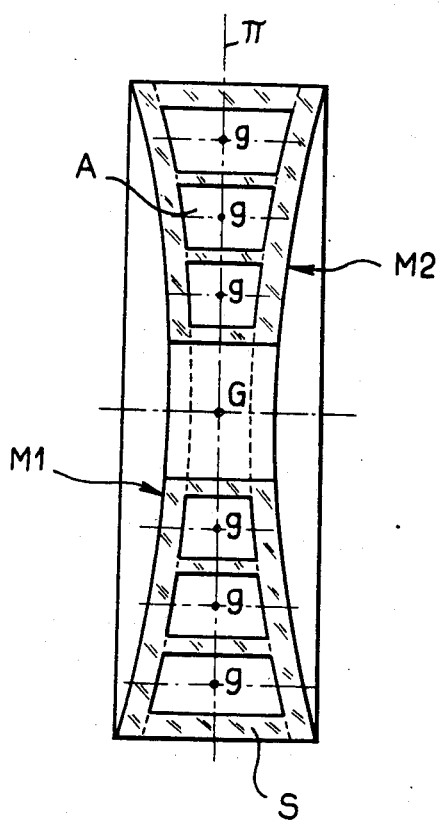
FIG_3  FIG_4

REDUCED-WEIGHT MIRROR

The invention relates to mirrors having a non-plane reflecting face (and in particular to mirrors having a concave or a convex reflecting face), and the invention relates in particular to mirrors having a diameter of more than 0.50 meters (m), and preferably to mirrors having a diameter of 2 m to 3 m or more. More particularly still, the invention is applicable to spherical and aspherical mirrors of large size as used in telescopes.

BACKGROUND OF THE INVENTION

Mirrors used in telescopes are often used with their optical axis in a position which is horizontal or nearly horizontal and it is well known that under such conditions the mirror tends to suffer from distortion phenomena due to the effect of gravity, and that such phenomena increase with increasing mirror diameter and with decreasing mirror stiffness.

Various means are used to prevent or mitigate this distortion phenomenon, and such means include, in particular, means for providing lateral support to the mirror via counterweights or air cushions.

Another technique consists in making a mirror as a honeycomb structure with walls delimiting hollow cells or cavities, with said structure having a front face on which a thin reflecting front wall is fixed, and a rear face on which a thin rear wall is fixed. The resulting assembly constitutes a mirror which is substantially lighter than a solid mirror.

However, because it is less rigid than a solid mirror, such a mirror is even more subject to deformation, and when attempts are made to avoid such deformation by means of counterweight systems or air cushion systems the overall weight of the assembly is increased, thereby losing at least some of the advantages due to the light weight of the mirror itself.

Preferred implementations of the present invention provide a reduced weight mirror which is less subject to distortion than is a solid mirror.

SUMMARY OF THE INVENTION

According to the present invention, this is achieved by providing cells in a solid mirror, with the cells being distributed in such a manner that the centers of gravity of the cell-surrounding portions of mirror material lie substantially in the same plane, which plane also includes the center of gravity of the mirror as a whole.

The term "substantially" is used to mean that the center of gravity is located either in said plane or else at a distance therefrom of not more than 1/100-th of the maximum thickness of the mirror.

This plane includes the bending neutral axis of the mirror and the mirror is supported by side contact points which are likewise in said plane.

BRIEF DESCRIPTION OF THE DRAWINGS

Mirrors embodying the invention are described by way of example with reference to the accompanying drawings, in which:

FIG. 3 is a view similar to FIG. 2 but through a plano-convex mirror; and

FIG. 4 is a section through a concave-concave mirror of reduced weight.

MORE DETAILED DESCRIPTION

Figure 1:
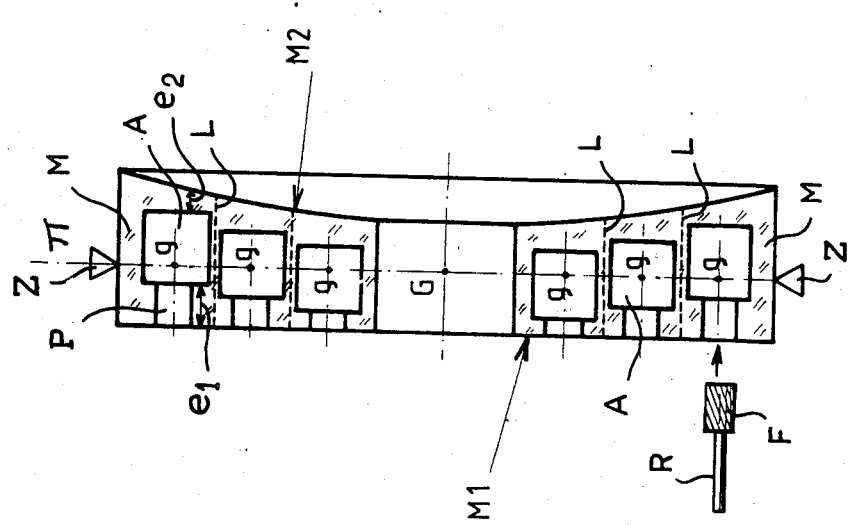
FIG. 1 is an axial cross-section through a plano-concave spherical mirror of reduced weight in accordance with the invention.

The mirror shown in FIG. 1 is constituted by a mass of glass or other optical material M having cavities or cells A machined therein from the rear face $M_1$ of the mirror. In this example the rear face $M_1$ is plane while the reflecting face $M_2$ of the mirror is concave.

The cells may be milled using a cutter F which is inserted into the mirror from its rear face and which is then displaced sideways in order to obtain the desired cell.

The same cutter may be used to mill the various cells in succession, or else a plurality of different cutters may be used simultaneously to mill a plurality of cells. It will be understood that it is advantageous to use a milling machine which is programmed by means of a computer, with the program ensuring that the centers of gravity g of the milled-out cell-surrounding portions of the mirror lie on a common plane $\pi$.

Preferably, the centers of gravity of the cell-surrounding portions are rendered coplanar mainly by suitably determining the distance $e_1$ between the cells and the rear face of the mirror.

For example, with a plano-concave mirror as shown in FIG. 1, the distance $e_1$ between a cell and the rear face of the mirror increases stepwise when going from the center of the mirror towards the periphery of the mirror, while the average distance $e_2$ between each cell and the reflective concave face $M_2$ of the mirror decreases stepwise when going from the center of the mirror towards the periphery thereof.

If the mirror is a plano-convex mirror (FIG. 3) the opposite occurs: the distance $e'_1$ between a cell and the rear face $M'_1$ of the mirror decreases stepwise when going from the middle of towards the periphery.

Figure 2:
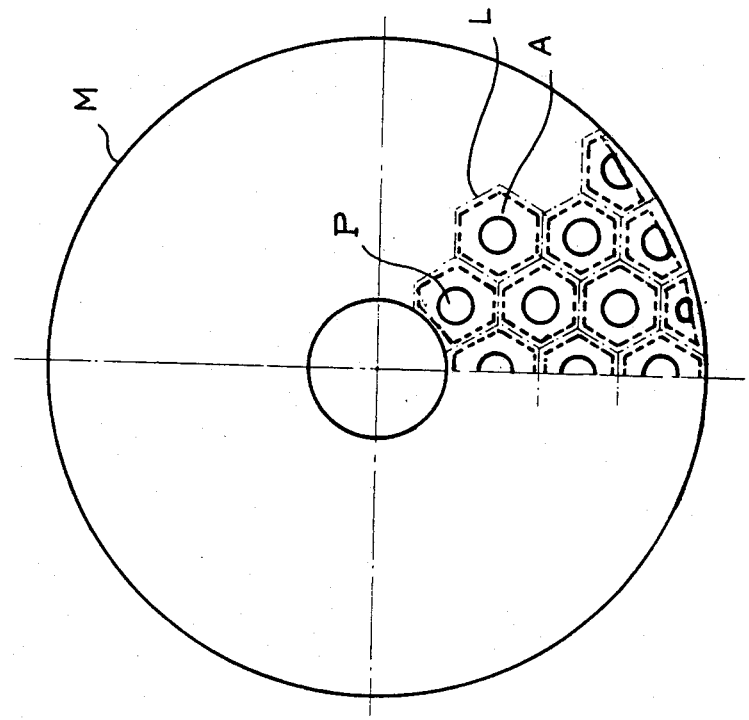
FIG. 2 is a diagram of the back face of the FIG. 1 mirror.

The cells A are preferably distributed as a honeycomb, as can be seen in FIG. 2, for example. This figure shows drill holes P through the rear face of the mirror and the hexagonal walls of the shells are shown in dashed lines around said holes P. Dot-dashed lines L designate the mid planes of the cell walls at equal distances from the opposite wall faces in adjacent cells. These mid planes L define the boundaries between adjacent cell-surrounding portions of the mirror.

FIG. 3 is a view similar to FIG. 1, but shows a plano-convex mirror instead of a plano-concave mirror. The same references are used as in FIG. 1, except that a prime (') has been added thereto.

By way of comparison, FIG. 4 shows a reduced weight equiconcave mirror having an internal honeycomb structure S having a front concave reflecting wall $M_2$ and a rear concave wall $M_1$. For practical reasons, the added-on front and rear walls are necessarily of constant thickness so that the centers of gravity of the cell-surrounding portions are constrained to be coplanar in the example shown where the internal structure is symmetrical about a plane of symmetry and where the front and rear walls are disposed symmetrically to each other about said plane. Such an equiconcave (or equiconvex) mirror necessarily comprises more material than a plano-convex (or a plano-concave) mirror, in addition to suffering from the drawback that it is more difficult to polish a mirror which does not include a plane rear face to act as a bearing surface during polishing.

The invention is not limited to cells of a particular shape or size.

The mirror is normally supported by a conventional mirror-support device whose contact points on the mirror are side contact points situated in the same plane $\pi$ ($\pi'$) as the centers of gravity. These side contact points are shown diagrammatically at Z in FIG. 1.

I claim:

1. A mirror having a non-plane reflecting face, said mirror being constituted by a mass of optical material having cells formed therein in such a manner that the center of gravity of the cell-surrounding portions of the mirror lie substantially in the same plane as the center of gravity of the mirror as a whole.

2. A mirror according to claim 1, wherein said cells are in a honeycomb configuration.

3. A mirror according to claim 2, wherein the rear face of the mirror is plane.

4. A mirror according to any one of claim 1, wherein the reflecting face of the mirror is concave and wherein the distance ($e_1$) between each cell and the rear face of the mirror increases stepwise when going from the center of the mirror towards the periphery thereof.

5. A mirror according to any one of claim 1, wherein the reflecting face of the mirror is convex and wherein the distance ($e'_1$) between each cell and the rear face of the mirror decreases stepwise when going from the center of the mirror towards the periphery thereof.

6. A mirror according to claim 1, wherein the diameter of the mirror is in the range 2 m to 3 m.

7. A mirror according to claim 1, wherein the mirror is supported by a device which comes in contact with the mirror via side contact points situated in said plane of the centers of gravity.

* * * * *

UNITED STATES PATENT AND TRADEMARK OFFICE
CERTIFICATE OF CORRECTION

PATENT NO. : 4,678,293

DATED : JULY 7, 1987

INVENTOR(S) : JACQUES PASERI

It is certified that error appears in the above-identified patent and that said Letters Patent is hereby corrected as shown below:

THE NAME OF THE SOLE INVENTOR SHOULD
BE CORRECTED TO READ AS FOLLOWS:

-- JACQUES PASERI --

Signed and Sealed this

Twenty-ninth Day of September, 1987

*Attest:*

DONALD J. QUIGG

*Attesting Officer*    *Commissioner of Patents and Trademarks*